US010614241B1

(12) United States Patent
Kirby et al.

(10) Patent No.: US 10,614,241 B1
(45) Date of Patent: Apr. 7, 2020

(54) ACCESS VERIFICATION FOR DISTRIBUTED FILE SYSTEMS

(71) Applicant: Qumulo, Inc., Seattle, WA (US)

(72) Inventors: Michael Patrick Kirby, Lynnwood, WA (US); Iain Michael Christopher Peet, Seattle, WA (US); Anthony Moon-Git Low, Seattle, WA (US); Aleksei Martynov, Seattle, WA (US); Jason Allan Sturgeon, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/234,334

(22) Filed: Dec. 27, 2018

(51) Int. Cl.
*G06F 21/62* (2013.01)
*G06F 16/13* (2019.01)
*H04L 29/08* (2006.01)
*G06F 16/11* (2019.01)

(52) U.S. Cl.
CPC ........ *G06F 21/6227* (2013.01); *G06F 16/122* (2019.01); *G06F 16/13* (2019.01); *G06F 21/629* (2013.01); *H04L 67/1097* (2013.01)

(58) Field of Classification Search
None
See application file for complete search history.

(56) References Cited

U.S. PATENT DOCUMENTS

| 6,236,996 B1* | 5/2001 | Bapat ........................ G06F 1/00 |
| 2001/0039622 A1* | 11/2001 | Hitz ........................ G06F 21/41 726/30 |
| 2004/0255048 A1 | 12/2004 | Lev Ran et al. |
| 2005/0015674 A1 | 1/2005 | Haugh |
| 2006/0123005 A1 | 6/2006 | Burnett et al. |
| 2008/0172366 A1* | 7/2008 | Hannel ............... H04L 63/0272 |
| 2009/0077087 A1 | 3/2009 | Urano et al. |
| 2010/0241668 A1 | 9/2010 | Susanto et al. |
| 2011/0039622 A1 | 2/2011 | Levenson |
| 2011/0125799 A1 | 5/2011 | Kandasamy et al. |
| 2015/0135331 A1 | 5/2015 | Das |
| 2016/0359859 A1 | 12/2016 | Capone |
| 2018/0288057 A1 | 10/2018 | Varadamma et al. |

OTHER PUBLICATIONS

Office Communication for U.S. Appl. No. 16/004,208 dated Aug. 27, 2018, pp. 1-11.

(Continued)

*Primary Examiner* — Grace Park
*Assistant Examiner* — Cheryl M Shechtman
(74) *Attorney, Agent, or Firm* — John W. Branch; Lowe Graham Jones PLLC

(57) ABSTRACT

Managing data in a file system with a verification engine that may obtain a user identifier associated with a user, an object identifier, and a target object. The verification engine may determine target identities associated with two or more file system protocols based on the user identifier. The verification engine may determine permission entries associated with the two or more file system protocols associated and the target object. The verification engine may employ the target identities and the permission entries to directly verify access rights to the target object for the user. Accordingly, the verification engine may provide a report that includes the target identities, the permission entries, or the access rights.

28 Claims, 9 Drawing Sheets

(56) References Cited

OTHER PUBLICATIONS

Office Communication for U.S. Appl. No. 16/234,395 dated Aug. 8, 2019, pp. 1-25.
Office Communication for U.S. Appl. No. 16/234,395 dated Mar. 28, 2019, pp. 1-55.
Kappes et al. "Dike: Virtualization-aware Access Control for Multitenant Filesystems" University of Ioannina, Greece, Technical Report No. DCS2013-1, 8, 61-64, pp. 1-6, Feb. 18, 2013.
Hitz et al. "Merging NT and UNIX Filesystem Permissions" In Proceedings of the 2nd conference on USENIX Windows NT Symposium—vol. 2 (pp. 1-10). USENIX Association, Aug. 3-4, 1998.

\* cited by examiner

ACCESS VERIFICATION FOR DISTRIBUTED FILE SYSTEMS

TECHNICAL FIELD

The present invention relates generally to file systems, and more particularly, but not exclusively, to managing or administering file permissions and access control in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. In many cases, distributed file systems may be accessed from client systems that may have different or mismatched permissions or access control semantics. Likewise, in some cases, file access in large file systems may traverse multiple system layers, transport layers, storage layers, or the like, that may be disposed between the client application and the stored file being accessed. In some cases, a mismatch of permissions or access control rights across two or more components or service layers associated with distributed file systems may cause outcomes that confuse or frustrate users of distributed file systems. However, troubleshooting some undesirable outcomes (e.g., denied access to a file) may be difficult because of the complexity of components or service layers associated with distributed file systems. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE VARIOUS EMBODIMENTS

Figure 1:
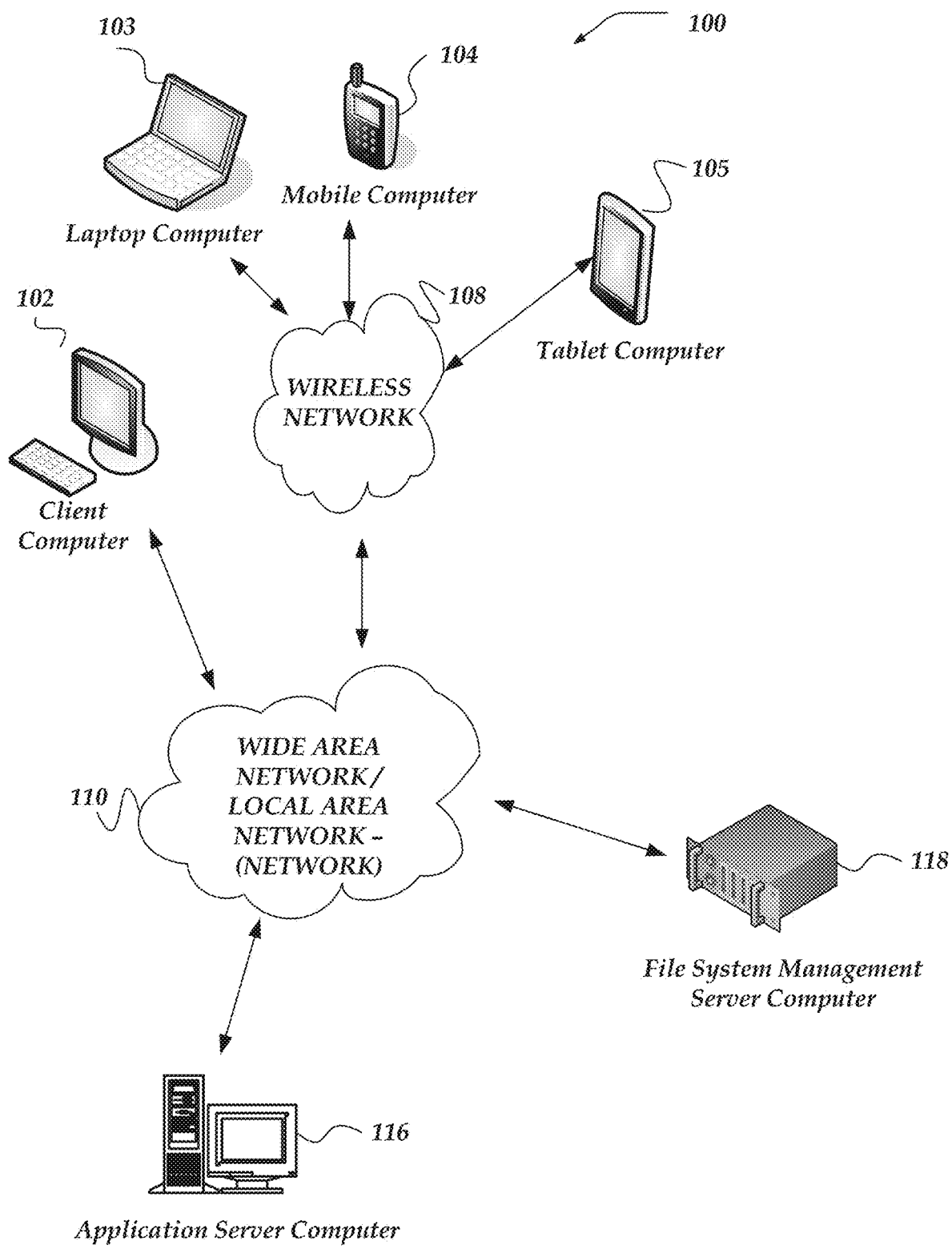
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "file system object," or "object" refer to entities stored in a file system. These may include files, directories, or the like. In this document for brevity and clarity all objects stored in a file system may be referred to as file system objects.

As used herein the term "target user" refers to a system or file system user that is having its permissions evaluated by a verification engine. In most cases, the verification engine will be associated with one user while it is being employed to verify a permissions scenario for another user. In this case, the other user may be considered the target user.

As used herein the term "target file system object" refers to file system objects that are subject to an evaluation of permissions by a verification engine. In most cases, the verification engine may be employed to verify the permissions information associated attempts by one or more users to access one or more file system objects. In this case, the file system objects that are the subject of the verification may be considered target file system objects.

As used herein the term "access control list" refers to a data structure that includes a collection of access information or security information associated with one or more file system objects. The collection includes entries that represent access rights or access protections that may be associated with a file system object. Note, as used herein, access control lists represent access or security information that may be represented, access, or stored in a variety of formats or locations. Accordingly, as used herein, an access control list is not limited to representing information for one particular operating system or vendor offering. For example, access control lists described herein are not strictly limited to Microsoft Windows access controls lists, commonly referred to as ACLs.

As used herein the terms "access control entry" or "permission entry" refer to an individual entry in an access control list or other collection of permission rules or rights. Generally, access control entries (ACEs) or permission entries comprise a trustee identifier, a type (allow or deny), a set of rights, control flags, or the like. In this context, the trustee may be a user, user accounts, user group, role, or the like, that may access the file system object that is associated with the ACL that includes the ACE.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a verification engine may be instantiated to perform actions for managing data in a file system, as described below.

In one or more of the various embodiments, the verification engine may be arranged to obtaining a user identifier and an object identifier such that the user identifier may be associated with one or more users and the object identifier may be associated with one or more target objects.

In one or more of the various embodiments, the verification engine may be arranged to determine one or more target identities based on the user identifier such that the one or more target identities may be associated with two or more file system protocols.

In one or more of the various embodiments, determining the one or more target identities, may further include: determining one or more target groups that include the one or more users as members; and providing one or more additional access rights based on the one or more determined target groups.

In one or more of the various embodiments, the verification engine may be arranged to determine one or more permission entries associated with the one or more target objects such that the one or more permission entries may be associated with the two or more file system protocols.

In one or more of the various embodiments, the verification engine may be arranged to employ the one or more target identities and the one or more permission entries to directly verify one or more access rights to the one or more target objects for the one or more users such that the access rights may be based on the one or more target identities and the one or more permission entries, and such that the direct verification may reduce latency and improve accuracy in providing access rights to the one or more users for the one or more target objects.

In one or more of the various embodiments, verifying the one or more access rights may further include: determining a path in the file system to the one or more target objects; traversing the path in the file system such that the one or more permission entries of each file system object disposed between a root of the file system and the one or more target objects are evaluated; and determining the one or more access rights of each intervening file system objects for the one or more users based on the one or more target identities and the one or more permission entries.

In one or more of the various embodiments, verifying the one or more access rights may further include: providing a target network address that may be associated with the one or more users; and modifying the one or more access rights based on the target network address.

In one or more of the various embodiments, the verification engine may be arranged to provide a report that includes the one or more target identities, the one or more permission entries, or the one or more access rights.

In one or more of the various embodiments, the verification engine may be arranged to determine pre-action access information that may be associated with one or more access actions such that the pre-action access information includes context data or metadata that may be associated with the one or more access actions. And employed to further determine the one or more access rights for the one or more users based on one or more portions of the pre-action access information.

In one or more of the various embodiments, a file system engine may be instantiated to perform actions, including: comparing the one or more access rights with one or more access requests that are associated with the user identifier and the object identifier; and executing the one or more access request based on an affirmative result of the comparison such that the one or more access requests are denied based on negative result of the comparison.

In one or more of the various embodiments, the verification engine may be arranged to determine one or more access actions that may be associated with the user identifier and the object identifier such that an execution of the one or more access action produces one or more persistent side-effects to the file system; and simulating the execution of the one or more access actions.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 are described in more detail below in conjunction with FIG. 3. Although FIG. 1 illustrates application server computer 116 and file system management server computer 118 each as a single computer, the innovations or embodiments are not so limited. For example, one or more functions of application server computer 116, file system management server computer 118, or the like, may be distributed across one or more distinct network computers. Moreover, in one or more embodiments, file system management server computer 118 may be implemented using a plurality of network computers. Further, in one or more of the various embodiments, application server computer 116, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
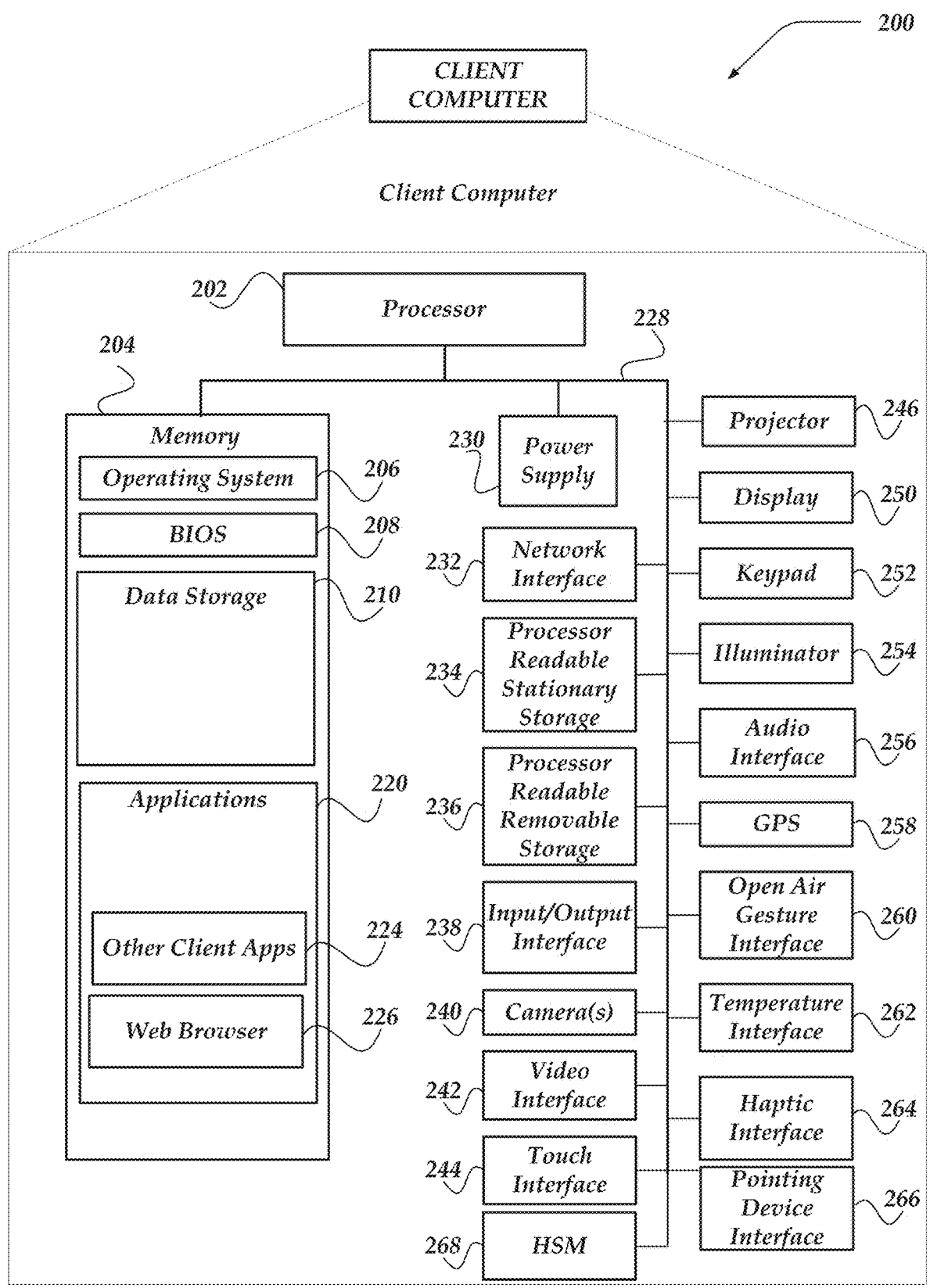
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiments, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
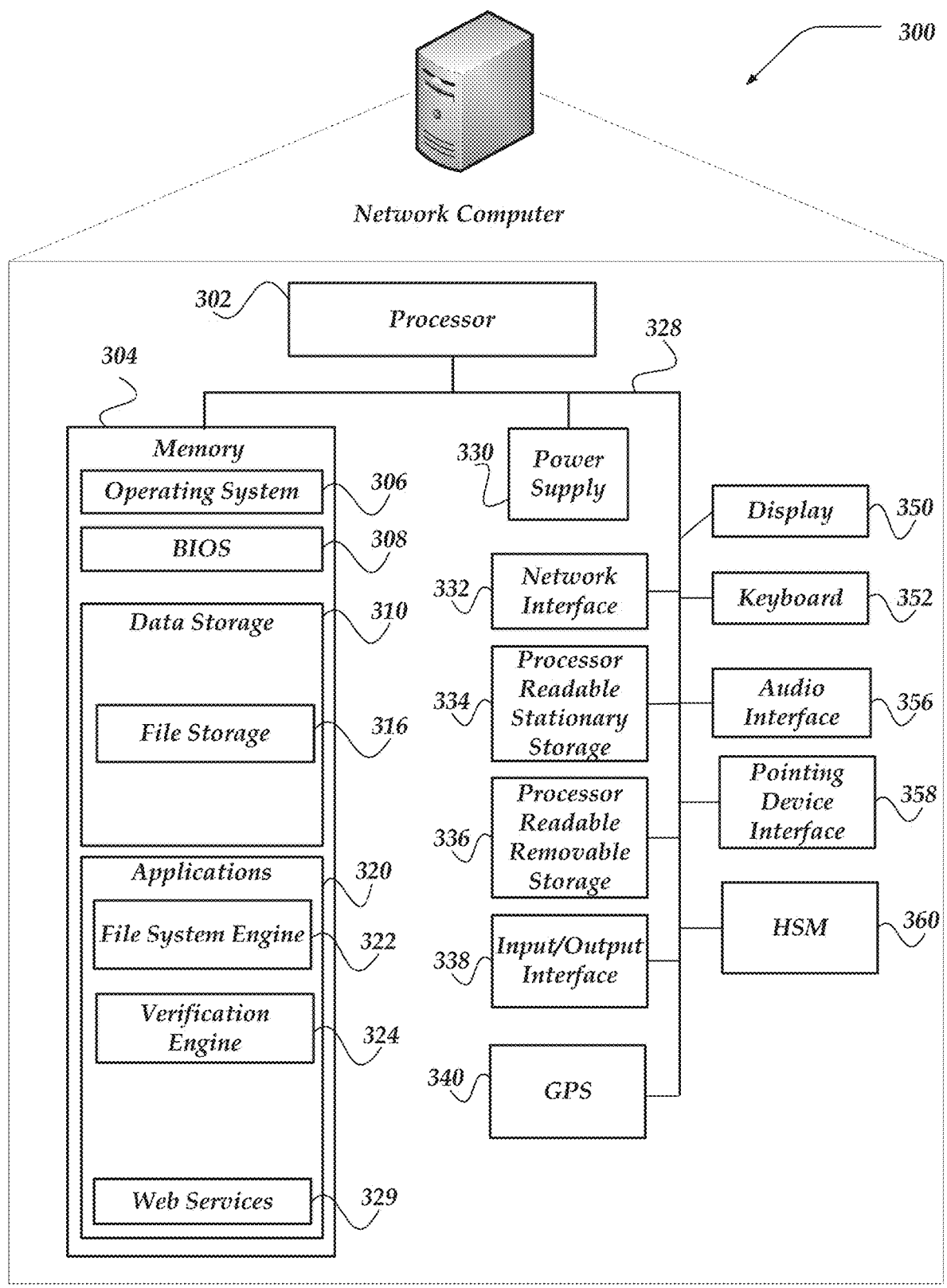
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or file system management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, verification engine 324, web services 329, or the like, may be arranged to employ geo-location information to select one or more localization features, such as, time zones, languages, currencies, currency formatting, calendar formatting, or the like. Localization features may be used in file system meta-data, file system objects, file systems, permissions, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 316, or the like. File storage 316 may store files, file system objects, documents, versions, properties, permissions information, file meta-data, data structures, or the like, that represent one or more portions of a distributed file system. In some embodiments, various storable objects (e.g., file system objects) may be divided into one or more blocks or pages that are stored in file storage 316.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, verification engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, verification engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, verification engine 324, web services 329, or the like, may be provisioned and de-commissioned automatically.

Also, in one or more of the various embodiments, file system engine 322, verification engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security or cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
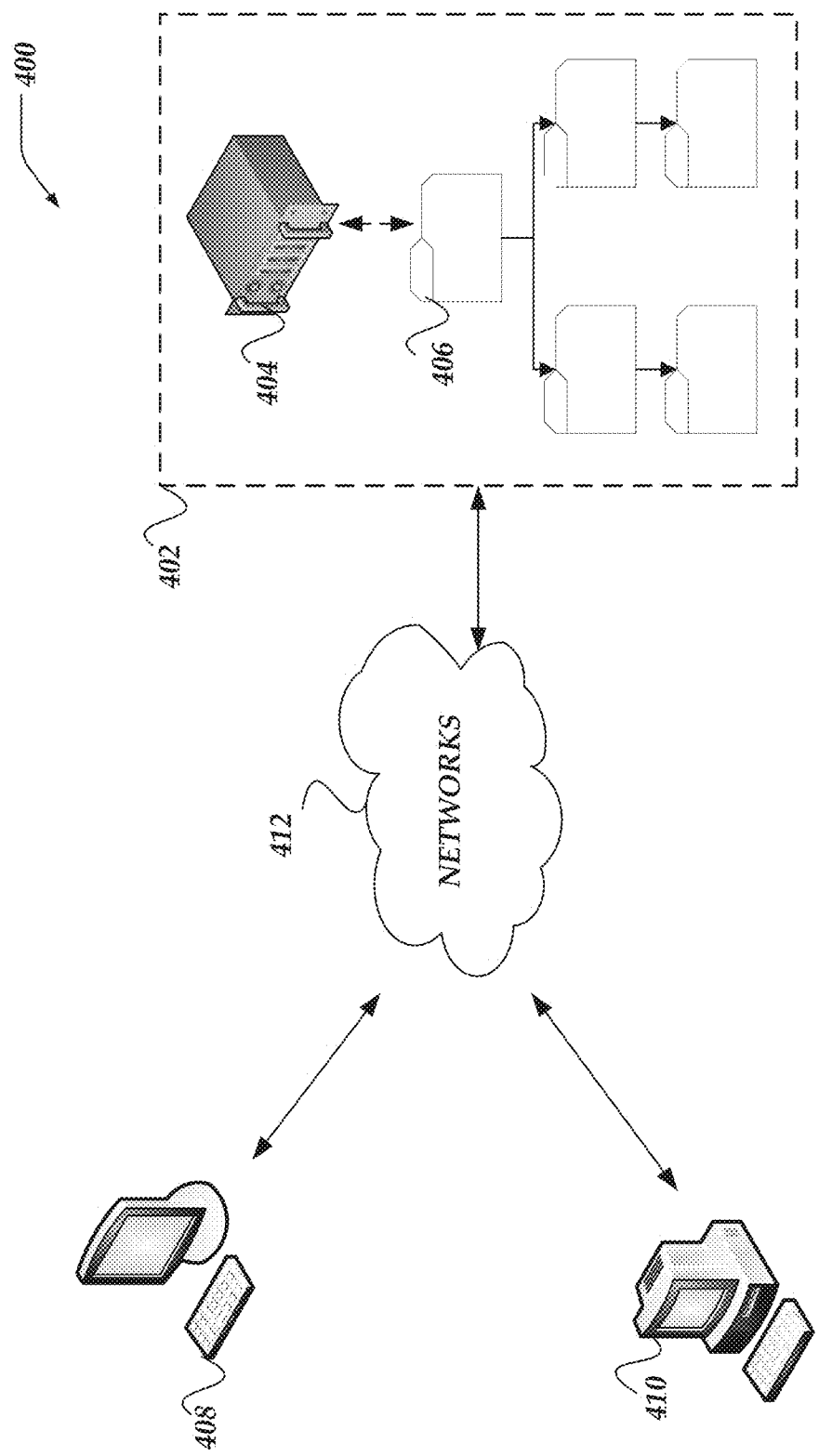
FIG. 4 illustrates a logical architecture of a system for access verification in distributed file systems in accordance with one or more of the various embodiments.

FIG. 4 illustrates a logical architecture of system 400 for access verification in distributed file systems in accordance with one or more of the various embodiments. In one or more of the various embodiments, file systems, such as, file system 402 may be arranged to be communicatively coupled to one or more networks, such as, networks 412. Accordingly, in one or more of the various embodiments, one or more clients, such as, client computer 408 and client computer 410 may be arranged to access file system 402 over networks 412. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 404. Also, in one or more of the various embodiments, file systems, such as file system 402 may include one or more file system objects, such as file system object 406 that may represent the various objects or entities that may be in file system 402. In some embodiments, file system objects may include, files, documents, directories, folders, change records, file system journals, backups, snapshots, replication information, versions, branches, blocks, pages, or the like. In some embodiments, primitive file system objects, such as, blocks, may be used to compose more complex file system objects.

In one or more of the various embodiments, the implementation details that enable file system 402 to operate may be hidden from clients such that they may be arranged to use file system 402 the same way they use other file systems, including local file systems. Accordingly, in one or more of the various embodiments, clients may be unaware that they are using a file system that spans one or more platforms, operating systems, networks, or the like.

Also, while file system 402 is illustrated as using one file system management computer with one set of file system objects, the innovations described herein are not so limited. Innovations herein contemplate file systems that include one or more file system management computers or one or more file system object data stores. In some embodiments, file system object stores (e.g., file storage 316) may be located remotely from one or more file system management computers. Also, a logical file system object store or file system may be spread across two or more cloud computing environments, storage clusters, one or more on-premises servers, or the like, or combination thereof.

Figure 5:
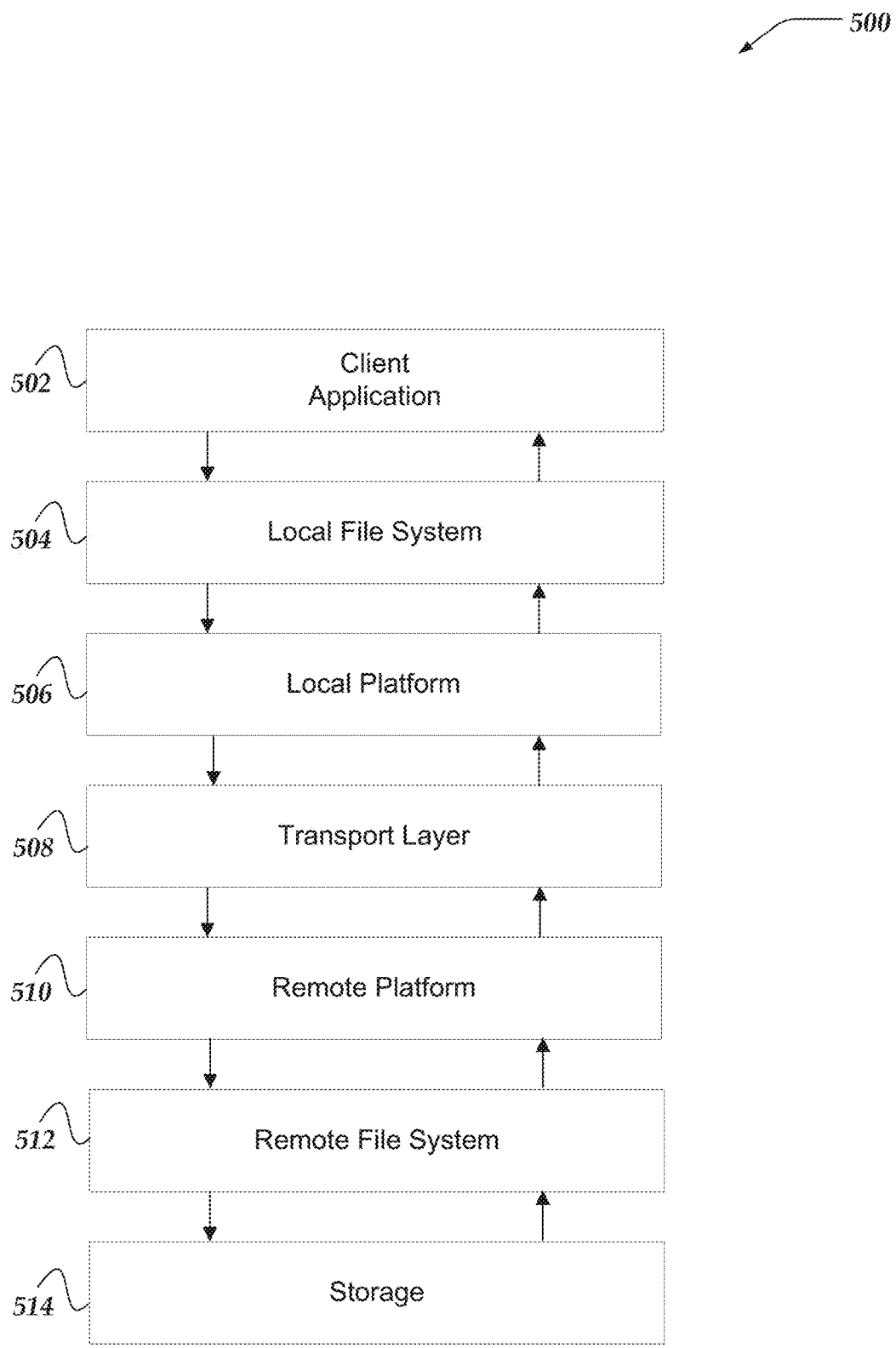
FIG. 5 illustrates a functional representation of a file system for access verification in distributed file systems in accordance with one or more of the various embodiments.

FIG. 5 illustrates a functional representation of file system 500 for access verification in distributed file systems in accordance with one or more of the various embodiments. In one or more of the various embodiments, distributed file systems, such as, file system 500 may be complex systems that include client application 502, local file system 504, local platform 506, transport layer 508, remote platform 510, remote file system 512, storage 514, or the like. In some embodiments, each layer of file system 500 may be the source of one or more file access failures. In some embodiments, the one or more file access failures may be caused by one or more configuration errors, or the like, that may be associated with one or more of the layers. Or, in some cases, access failures may correct responses to a client attempting to access file system objects that are restricted.

In one or more of the various embodiments, users may employ client application 502 to access a file stored on storage 514. Accordingly, in some embodiments, a file system engine, such as, file system engine 312 may be arranged to receive file access requests from client application 502. Accordingly, in one or more of the various embodiments, the file system engine may be arranged to perform one or more action to marshal the user's file access request through the various layers of the distributed file system until it reaches the file on storage 514.

In one or more of the various embodiments, at any point in the file access transaction from client application 502 to storage 514 or back again, there may be an access denial or other access related failure. In conventional systems, upon the occurrence of an access failure (at any layer in the file system), the user may receive an access denied message, or the like. Accordingly, while the user may be informed that their access attempt has failed, they may not receive information that informs them of why the access attempt failed nor which layer or sub-system may be associated with the access failure. For example, a client attempting to access a file located on a remote storage area of the file system will either successfully access the file, or receive an access denied response. The absence of additional information may make it difficult for the user or administrators to determine why the file access attempt failed.

Further, in some embodiments, one or more of ordinary skill in the art will appreciate that a distributed file system may include additional components or layers, such as, cache tiers, additional transport layers, or the like, than show here. However, for brevity and clarity additional file system components or layers are omitted from this representation of file system 500. However, file system 500 is at least sufficient for disclosing the innovations described herein.

Generalized Operations

Figure 6:
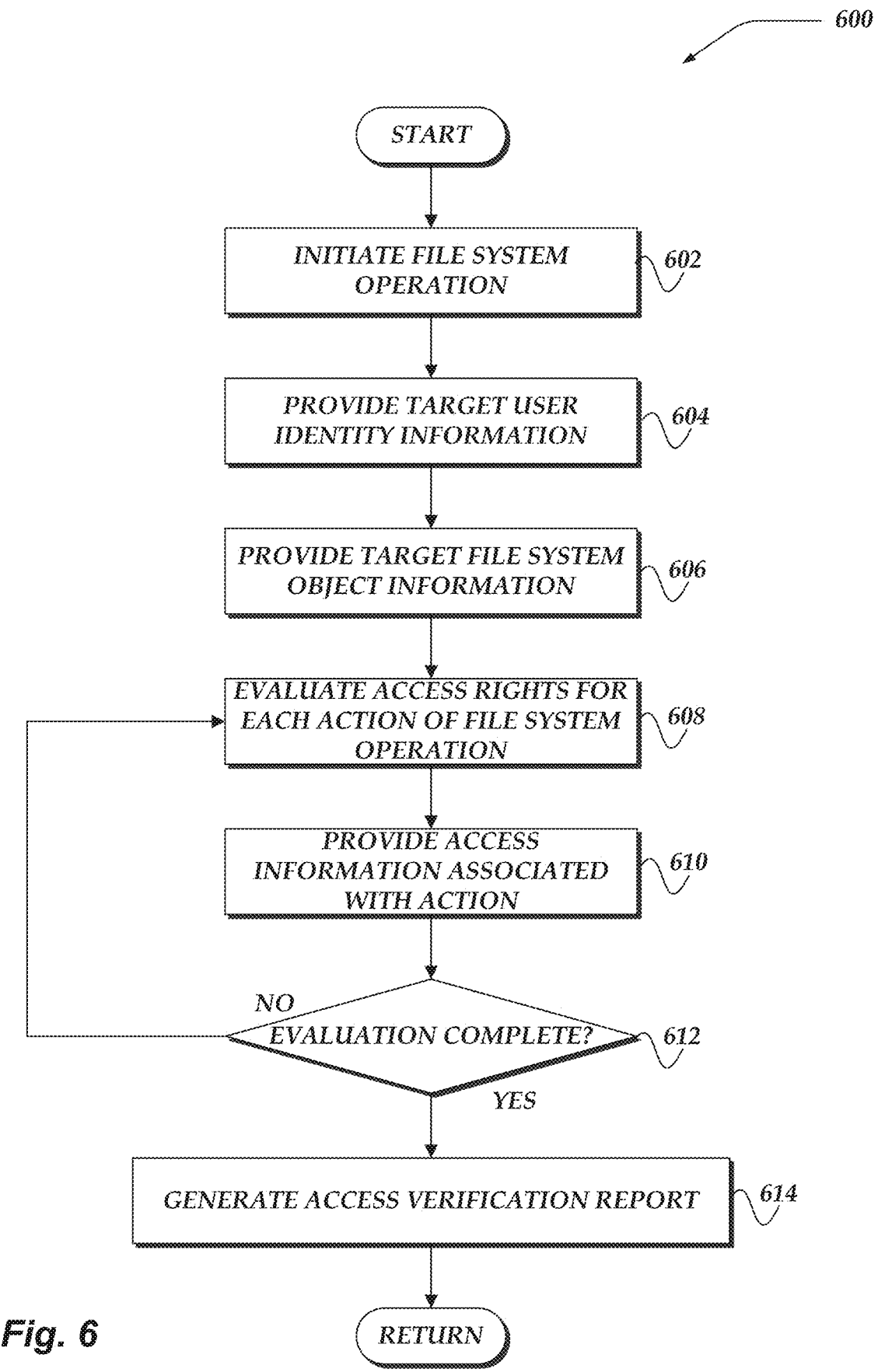
FIG. 6 illustrates an overview flowchart of a process for access verification in distributed file systems in accordance with one or more of the various embodiments.
Figure 7:
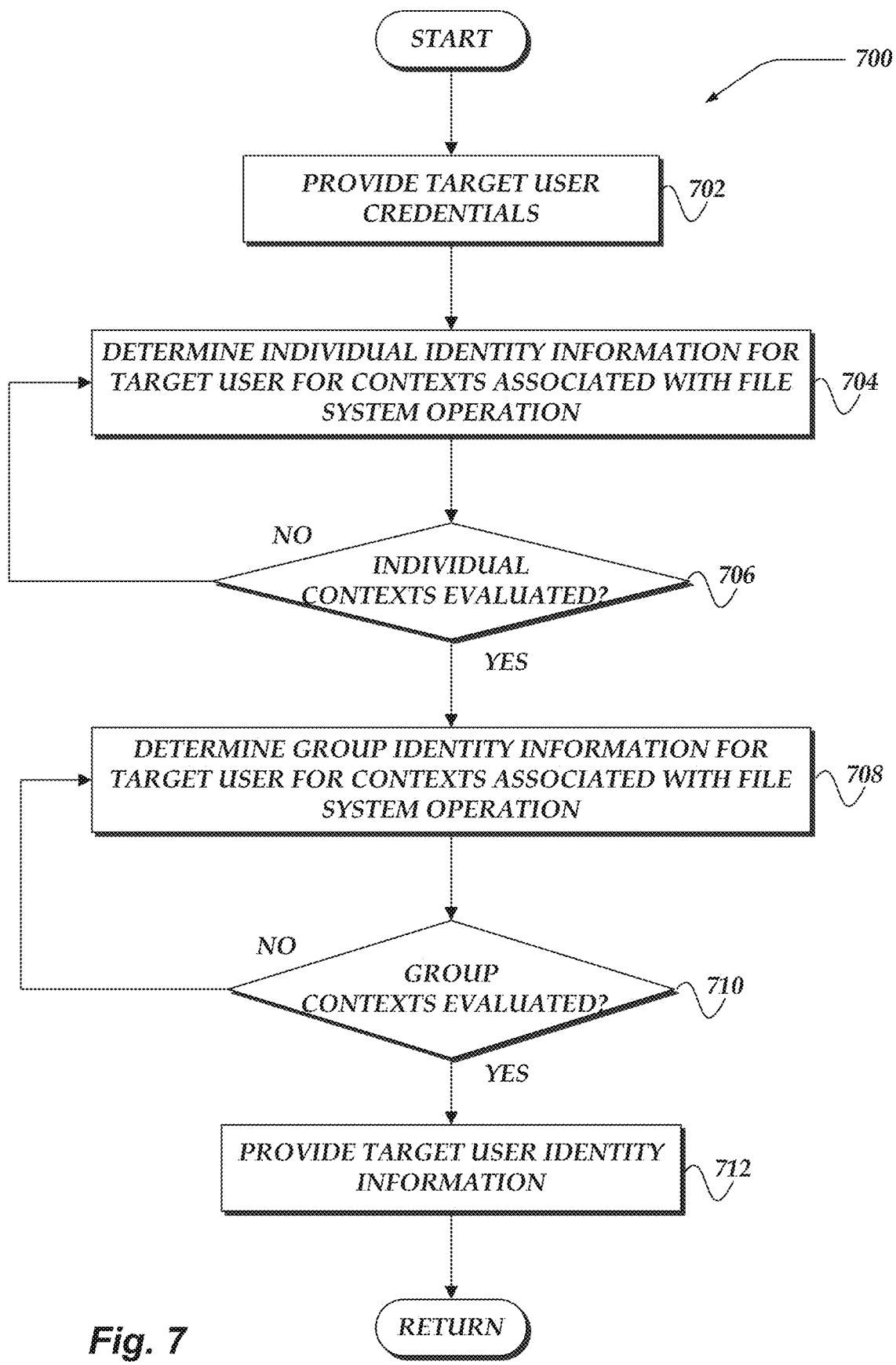
FIG. 7 illustrates a flowchart of a process for determining target user identity information in accordance with one or more of the various embodiments.
Figure 8:
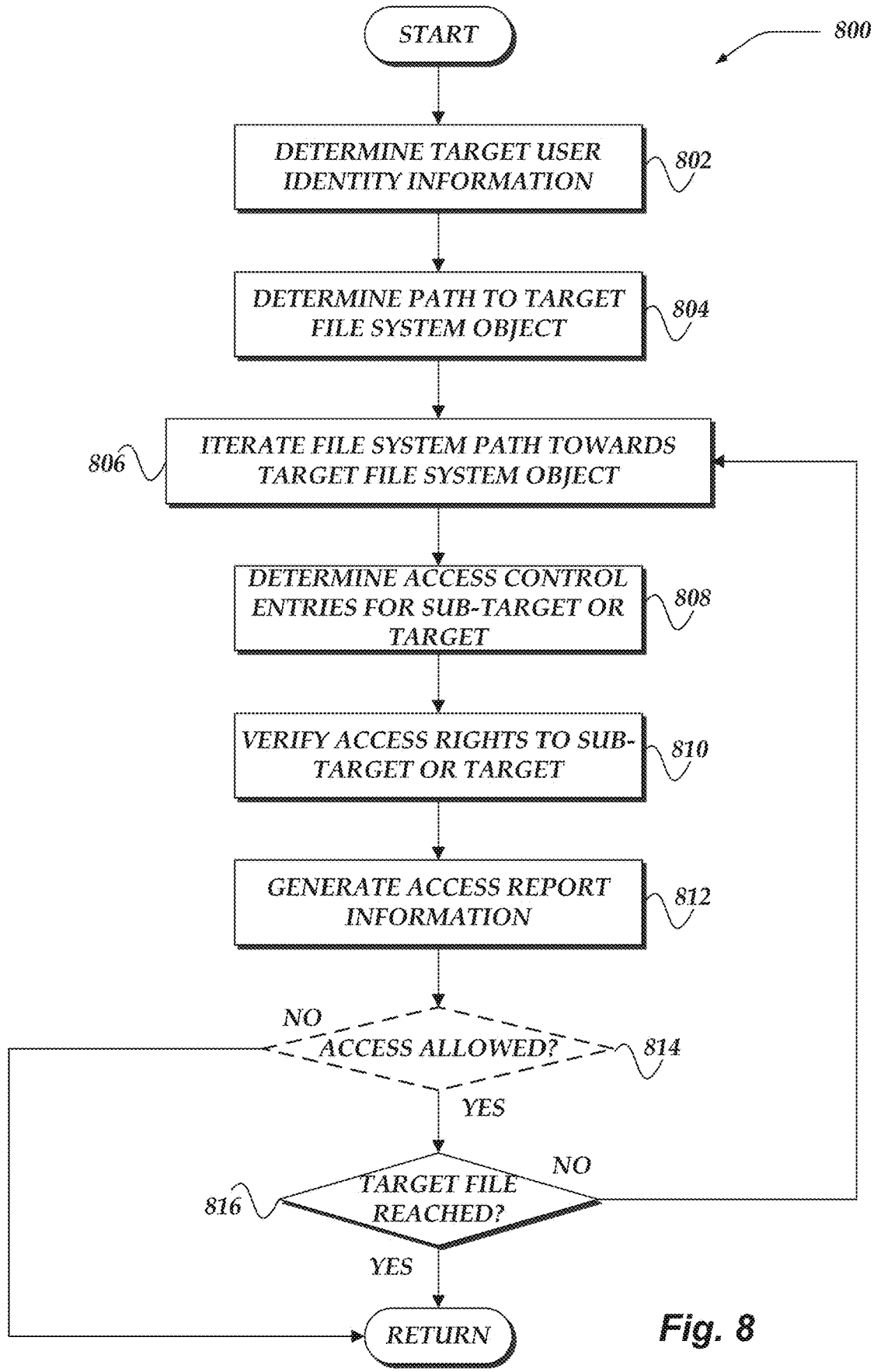
FIG. 8 illustrates a flowchart of a process for evaluating access rights in accordance with one or more of the various embodiments.

FIGS. 6-8 represent generalized operations for access verification in distributed file systems in accordance with one or more of the various embodiments. In one or more of the various embodiments, processes 600, 700, and 800 described in conjunction with FIGS. 6-8 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-11 may perform actions for access verification in distributed file systems in accordance with at least one of the various embodiments or architectures such as those described in conjunction with FIGS. 4-5. Further, in one or more of the various embodiments, some or all of the actions performed by processes 600, 700, and 800 may be executed in part by file system engine 322 or verification engine 324 running on one or more processors of one or more network computers.

FIG. 6 illustrates an overview flowchart of process 600 for access verification in distributed file systems in accordance with one or more of the various embodiments. After a start flowchart block, at flowchart block 602, in one or more of the various embodiments, one or more file system operations may be initiated. In some embodiments, a client application may be arranged to submit one or more file system operations accompanied with a variety of parameter values that define one or more characteristics of the operation that is being initiated.

In some embodiments, the parameters supplied may include, target file system object, path to target file system object, target user identifiers, target client location (e.g., network address, geographic location, organization department, or the like), target client type, or the like. In some embodiments, the verification engine may be arranged to supply default value for one or more parameters unless substitute value are provided. Note, in one or more of the various embodiments, the parameter types, ranges, values, patterns, or the like, as well as default values, if any, may be enforced based on configuration information provided from one or more of configuration files, user-input, built-in values, or the like, or combination thereof.

In some embodiments, the file system operation may be limited to evaluating the access rights or permission information associated with the target user and the target file system object rather than performing a particular operation on the target file system object.

In one or more of the various embodiments, the file system operation may include one or more of opening a file system object, creating a file system object, moving a file system object, deleting a file system object, reading a file system object, writing to a file system object, renaming a file, changing the access rights associated with a file system object, changing ownership of a file system object, or the like, or combination thereof. For example, in some embodiments, a user may have received an access failure when trying to copy a file from a local directory to a shared directory that is part of a distributed file system. Accordingly, in this example, the failed copy attempt may be considered the file system operation.

In some embodiments, other file system operations including, directory listings, sharing directories (e.g., sharing portions of the file system) to other users or locations, may be provided as well.

At flowchart block 604, in one or more of the various embodiments, a verification engine or a file system engine may be arranged to provide information associated with the identity of the target user associated with the initiated file system operation. In some embodiments, the file system operation may include one or more pieces of information associated with the identity of a target user. As described above, a target user may be a user that may be associated with the file system operation. For example, referring to example, in flowchart block 602, identity information associated with the user that experienced the access failure may be provided. In one or more of the various embodiments, the identity information may include user name, user number, an alias, or the like. Also, in some embodiments, the user identity information may include one or more additional credentials, such as, passwords, security certificates, or the like.

In one or more of the various embodiments, the verification engine may employ the target user information to provide additional identifying information that may be associated with the target user. In some embodiments, this may include, identity aliases, group membership, role information, or the like. In some embodiments, the additional information may describe characteristics in the context of two or more file system protocols or platforms, such as, Server Message Block (SMB), Network File System (NFS), Common Internet File System (CIFS), or the like.

Further, in some embodiments, the file system engine may provide a "native" file system protocol that it employs to implement the underlying distributed file system used for storing file system objects. Accordingly, in some embodiments, the verification engine may be provided one or more target user characteristics represented using its native protocols.

In one or more of the various embodiments, the verification engine may be arranged to communicated with one or more other systems to retrieve or validate the identity information associated with the target user. For example, the verification engine may be arranged to employ a remote LDAP service to obtain, validate, or verify one or more portions of the identity information that is associated with a target user.

At flowchart block 606, in one or more of the various embodiments, the verification engine or the file system engine may be arranged to provide information associated with the identity or location of the target file system object associated with the initiated file system operation. In some embodiments, this may include one or more of a file name, a file path, URI, file serial number, or the like. In some embodiments, the file system object identifiers may have one or more aliases. Also, in some embodiments, the provided identifiers may vary depending on the local file system or platform being using by the client. Likewise, in some embodiments, the provided identifiers may include the same identifiers provided for a previously failed access attempt. For example, an administrator may be attempting to duplicate a file operation performed on another platform or local file system to troubleshoot a user reported access error. In this example, the file system operation being duplicated may have been originally attempted on a platform that uses different naming or identifier semantics than the than platform being used by the administrator doing the troubleshooting. Accordingly, the administrator may provide information to identify the target file system object that matches the platform used by the reporting user.

In one or more of the various embodiments, the verification engine may employ the target file system object information to provide additional identifying information that may be associated with the target file system object. In some embodiments, this additional information may include information that describes one or more characteristics of the target file system object that may be associated with it. In some embodiments, this may include, identity aliases, paths, real locations, virtual locations, or the like. In some embodiments, the additional information may describe characteristics in the context of two or more file system protocols, such as, Server Message Block (SMB), Network File System (NFS), Common Internet File System (CIFS), or the like.

In one or more of the various embodiments, the verification engine may be arranged to employ the target file system object information to lookup or obtain one or more access rights or access rules that may be associated with the target file system object. Note, in one or more of the various embodiments, this may include obtaining multiple representations of the access rights, where the different representations may correspond to one or more different file system protocols or platforms, such as, one or more access control lists, POSIX-style mode information, or the like.

Further, in some embodiments, the file system engine may provide a "native" file system protocol that it employs to implement the underlying distributed file system used for storing file system objects. Accordingly, in some embodiments, the verification engine may be provided one or more target file system object characteristics represented using its native protocols.

At flowchart block 608, in one or more of the various embodiments, the verification engine may be arranged to evaluate the access rights for each action that may comprise the file system operation. In one or more of the various embodiments, the file system engine may be arranged to apply the target user identity and the target file system object to perform the file system operation. In one or more of the various embodiments, each file system operation may comprise one or more actions that may be associated with evaluating the access rights to associated with the file system operation. In some embodiments, for each action the verification engine may be arranged to evaluate the access rights required or associated with the action.

In some embodiments, the file system engine may simulate the performance of the file system operation. Accordingly, in these cases, the verification engine may be arranged to evaluate actions that may be performed during a real execution of the file system operation.

In one or more of the various embodiments, the file system engine may employ the verification engine to verify access rights in various circumstances and to report the results for each step of the file system operation. In some embodiments, the file system engine may be arranged to employ the verification engine as a service to determine access rights. In other circumstances, in some embodiments, the file system engine may be arranged to determine the access rights and the verification engine may be arranged to evaluate the inputs, outputs, or results associated with the access right actions for inclusion in an access right verification report.

At flowchart block 610, in one or more of the various embodiments, the verification engine may be arranged to provide the access information associated with each evaluated action. As access right actions associated with the file system operation are executed, the verification engine may be arranged to collect the access information associated with the action. In some embodiments, the verification engine may be arranged to collect the access information for generating a report. Alternatively, in some embodiments, the verification engine may be arranged to stream the information to a receiver service as it is determined. For example, in some embodiments, the verification engine may be arranged to stream results in real-time to a console applications, graphical user-interfaces, network communication ports, or the like.

In one or more of the various embodiments, access information may include target user identity information, group membership, access control lists (ACLs) associated with the target file system objects, individual access control entries (ACEs), POSIX-style mode information, access attempt result information (e.g., access denied or access allowed), or the like, or combination thereof.

At decision block 612, in one or more of the various embodiments, if the evaluation of the access rights for each file system operation is complete, control may flow to flowchart block 614; otherwise, control may loop back to flowchart block 608. In one or more of the various embodiments, a given file system operation may include several actions that span one or more computers, processes, networks, clusters, or the like. Accordingly, in one or more of the various embodiments, the file system engine and verification engine may be arranged to process or evaluate each access right action associated with the file system operation until the file system operation is complete or the simulated file system operation is completed.

At flowchart block 614, in one or more of the various embodiments, the verification engine may be arranged to generate an access verification report that may be associated with the file system operation. In some embodiments, the verification engine may produce a report that includes the access right information that was discovered during the execution of the file system operation or file system operation simulation. In some embodiments, the report may be stored for later display or review. In some embodiments, some or all of the information included in the report may be displayed in a graphical user interface. In some embodiments, some or all of the information included in the report may be communicated to another service or application for further interpretation, archival, distribution, or the like.

In one or more of the various embodiments, some or all of the information included in the report may be provided in structured format suitable for processing or display by another reporting tool, visualization tools, other applications or services, or the like, or combination thereof.

Next, in one or more of the various embodiments, control may be returned to a calling process.

FIG. 7 illustrates a flowchart of process 700 for determining target user identity information in accordance with one or more of the various embodiments. After a start flowchart block, at flowchart block 702, in one or more of the various embodiments, one or more credentials or other identifiers associated with a target user may be provided to a verification engine. In one or more of the various embodiments, this may include usernames, group names, user identifiers, passwords, pass phrases, PIN numbers, cryptographic security certificates, or the like, or combination thereof.

Note, in some embodiments, the target user credential information may be provided to the system by another user, such as, an administrator, customer service technician, or the like. In some embodiments, if the other user is investigating a reported access failure, the other user may input the credentials having the same format or values as used during the access failure.

At flowchart block 704, in one or more of the various embodiments, the verification engine may be arranged to begin determining individual identity information that may be associated with the target user for the various security contexts that may be associated with the file system operation.

In one or more of the various embodiments, the supplied target user credentials may be associated with one or more different user credentials or user credential information within the same distributed file system. Accordingly, in one or more of the various embodiments, the verification engine may be arranged to determine the individual identify information associated with the target user. In some embodiments, the verification engine may determine identity information for one or more contexts that may be associated with the target user. For example, a target user may be associated with individual identity information that supports multiple platforms or security contexts. Thus, in some embodiments, the verification engine may be arranged to determine the individual identity information for each context.

In one or more of the various embodiments, the target file system object may determine one or more portions of the identity information. In some embodiments, some file system objects may be associated with security contexts associated by where the file system object is stored or what type of platform is used to access it. For example, identity information for a target user in the context of a Linux platform may be different than the identity information in the context of a Windows platform. Also, in some embodiments, the distributed file system may include custom or native identity information that is separate from identity information used by one or more computing platforms or file system protocols.

In some embodiments, portions for the file system may be configured to treat one or more target users as another user. For example, in some embodiments, one or more portions of a file system may be configured to map one or more target users to a common or shared user.

In one or more of the various embodiments, one or more access rights, permissions, access privileges, access rules, or the like, or combination thereof (e.g., or simply access rights), may be associated with one or more portions of the individual identity information. Accordingly, in one or more of the various embodiments, providing a complete set of individual identity information may also determine the access rights associated with the target user.

At decision block 706, in one or more of the various embodiments, if the security contexts for the individual target user have been evaluated, control may flow to flowchart block 708; otherwise, control may loop back to flowchart block 704. In one or more of the various embodiments, the verification engine may be arranged to iterate through the various security contexts or security configurations that may be associated with the target user to determine a complete view of the identity information associated with the target user.

At flowchart block 708, in one or more of the various embodiments, the verification engine may be arranged to begin determining group identity information that may be associated with the target user for the various security contexts that may be associated with the file system operation. In some embodiments, group identity information describes the permission groups or user groups that include the target user. In some embodiments, target users may be associated with multiple groups that may or may not be known persons associated with the target user account.

Accordingly, in one or more of the various embodiments, the verification engine may be arranged to determine the group identity information associated with the target user. In general, the process may be similar to how individual identity information is determined. In some embodiments, the verification engine may evaluate one or more security contexts associated with the file system operation and target file system object to determine group identity information that may relevant for access verification.

In one or more of the various embodiments, one or more access rights, permissions, access privileges, access rules, or the like, or combination thereof (e.g., or simply access rights), may be associated with each portion of group identity information. Accordingly, in one or more of the various embodiments, providing a complete set of group identity information may also determine one or more of the access rights associated with the target user based on the group membership of the target user.

At decision block 710, in one or more of the various embodiments, if the security contexts for the groups associated with the target user have been evaluated, control may flow to flowchart block 7012; otherwise, control may loop back to flowchart block 708.

At flowchart block 712, in one or more of the various embodiments, the verification engine may provide the target user identity information for access verification. In some embodiments, the verification engine may be arranged to provide a data structure that includes the collected individual identity information and the group identity information. This data structure may be employed to populate reports or user interfaces used for access verification.

Next, in one or more of the various embodiments, control may be returned to a calling process.

FIG. 8 illustrates a flowchart of process 800 for evaluating access rights in accordance with one or more of the various embodiments. After a start flowchart block, at flowchart block 802, in one or more of the various embodiments, a verification engine may be arranged to determine the identity information that may be associated with a target user. As described above, a comprehensive collection of the identity information associated with the target user may be determined.

At flowchart block 804, in one or more of the various embodiments, the verification engine may be arranged to determine the path within the distributed file system to the target file system object. In one or more of the various embodiments, often there may be one or more file system objects that are disposed between the root of the file system and the target file system object, such as, one or more directories, one or more sub-directories, shared file system portions, network file system portion, or the like.

In some embodiments, a file system or distributed file system may store one or more file system objects at various locations that may be physically separate even though to a user these separate physical locations appear to be part of same file system. Accordingly, in some embodiments, the target user may be unaware that the path to the target file system object crosses one or more physical boundaries that may have different security contexts or access configurations.

Likewise, in some embodiments, a file system or distributed file system may store one or more file system objects at various locations that may be logically separate even though to a user these separate locations may appear to be part of the same file system. For example, a file system may include two or more partitions, volumes, Accordingly, in some embodiments, the target user may be unaware that the path to the target file system object crosses one or more logical boundaries that may have different security contexts or access configurations.

For example, in some embodiments, a path to the target file system object may be represented as "/a/b/c/f/object" where each portion of the path (e.g., a, b, c, or f) have different access rules or permissions. For example, in some embodiments, the a, b, c, or f may be directories or folder location on different physical locations or different logical locations that may be associated with different access rules or permission. In some cases, the different locations may support different file system features in addition to having different access rules or permissions.

At flowchart block 806, in one or more of the various embodiments, the verification engine may be arranged to iterate through the path towards the target file system object. In one or more of the various embodiments, the path to the target file system object represents a sequence of file system objects in a file system that terminates at the target file system object. Accordingly, in some embodiments, each file system object in the sequence may be considered for determining access rights or access verification.

At flowchart block 808, in one or more of the various embodiments, the verification engine may be arranged to determine access rights information associated with one or more file system objects that are encountered during the iteration through the path. Here, in some embodiments, the verification engine may determine the access rules for each file system object disposed between a root of the file system operation and the target file system object. For example, if the path to a target file system object X is /a/b/c/X, the access rules for the file system objects a, b, and c may be determined. For example, the access rules for 'a' may allow access by all users, while the access rules for 'b' may allow access by some users, and the access rules for 'c' may allow access by all users.

At flowchart block 810, in one or more of the various embodiments, the verification engine may be arranged to verify the access rights associated with the target user and the encountered file system objects. E.g., the file system objects intervening between the root of the operation and the target file system object.

At flowchart block 812, in one or more of the various embodiments, the verification engine may be arranged to generate access information for an access report. For example, an access information may include identifying one or more intervening file system objects caused or resulted in an access failure.

At decision block 814, in one or more of the various embodiments, optionally, if the target user has access rights to the encountered target file system object, control may glow to decision block 816; otherwise, control may be returned to a calling process. This decision block is indicated as optional because in some embodiments, the verification engine may be arranged to evaluate the access rights for all intervening file system object and the target file system object rather than terminating the evaluation at the first encountered access failure.

At decision block 816, in one or more of the various embodiments, if the encounter target file system object is the target file system object associated with the file system operation, control may be returned to a calling process; otherwise, control may loop back to flowchart block 806.

Next, control may be returned to a calling process.

Figure 9:
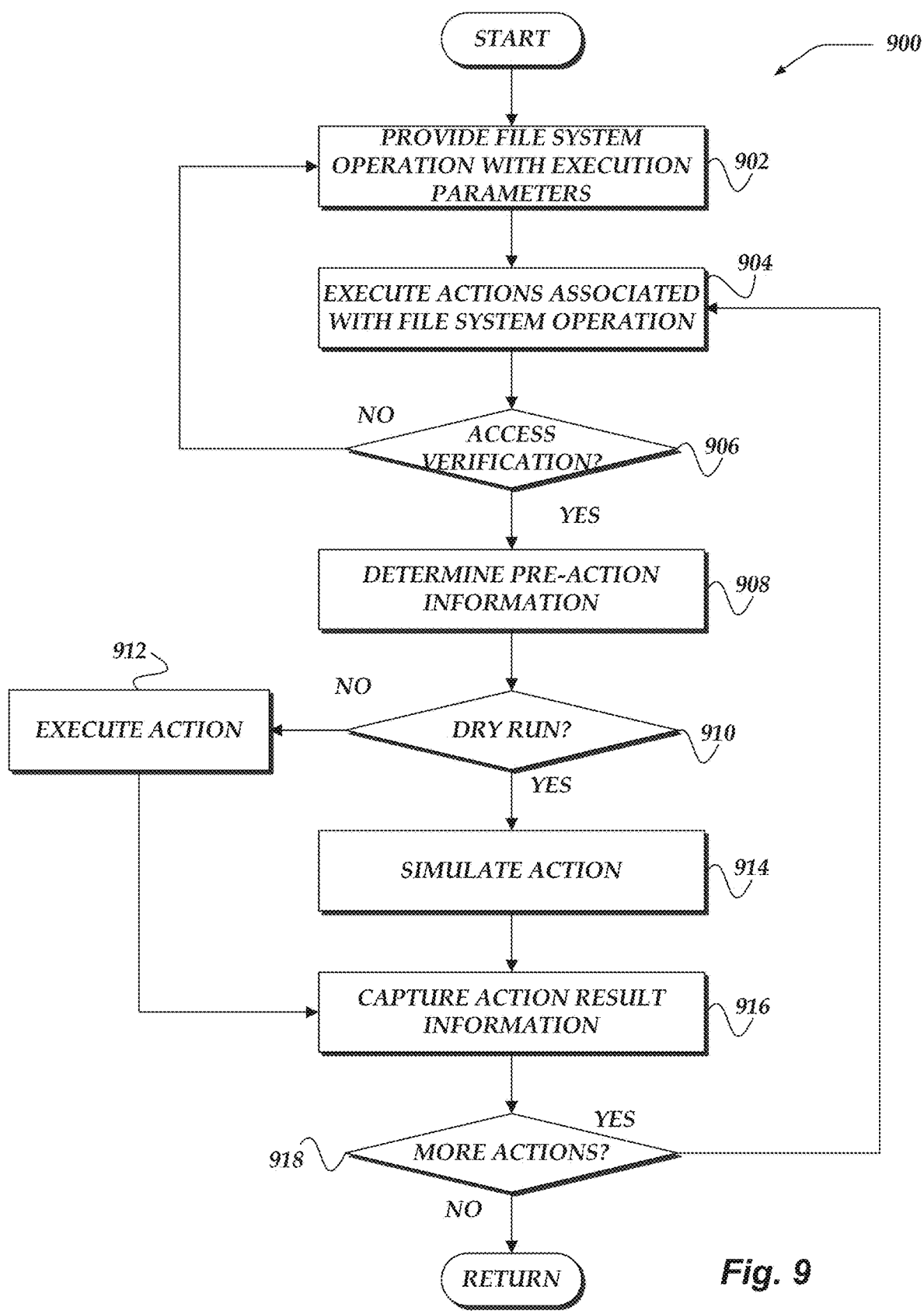
FIG. 9 illustrates a flowchart of a process for evaluating access rights for one or more access actions that comprise a file system operation in accordance with one or more of the various embodiments.

FIG. 9 illustrates a flowchart of process 900 for evaluating access rights for one or more access actions that comprise a file system operation in accordance with one or more of the various embodiments. After a start flowchart block, at flowchart block 902, in one or more of the various embodiments, a file system operation and one or more execution parameters may be provided via a client application. As described above, file system operations may include various operations directly or indirectly related to accessing a file system object. In some embodiments, the file system object may be associated with one or more system or application commands for accessing file system objects. In some embodiments, file system operations may include creating files, reading files, moving files, deleting files, sharing files, listing directories, creating directories, moving directories, changing file access rules or permissions, or the like.

At flowchart block 904, in one or more of the various embodiments, a file system engine may be arranged to execute one or more actions that comprise the file system operation. In one or more of the various embodiments, a file system operation may be comprised of one or more actions that may be executed to perform the file system operation. In some embodiments, some actions may be executed in sequence or serially. And, in some embodiments, some actions may be executed in parallel. In one or more of the various embodiments, actions may be arranged to perform one or more lower level tasks the contribute to completing or attempting to complete the requested file system operation.

At decision block 906, in one or more of the various embodiments, if access verification is enabled, control may flow to flowchart block 908; otherwise, control may loop back to flowchart block 902. In one or more of the various embodiments, access verification may be selectively enabled. Accordingly, in one or more of the various embodiments, if access verification is not enabled, the file system operation proceeds without interaction with the verification engine.

At flowchart block 908, in one or more of the various embodiments, the verification engine may be arranged to determine pre-action information that may be associated with the performance of the action. In one or more of the various embodiments, prior to performing an action, the file system engine may be arranged to employ the verification engine to determine pre-action access information that may be associated with the action. In some embodiments, the pre-action access information may include context data or metadata that may be associated with the upcoming action. In one or more of the various embodiments, the pre-action access information may be included in the access verification report. The specifics of the pre-access information may depend on the particular action. In some embodiments, pre-access information may include one or more input parameters and values that may be consumed or processed by the action.

At decision block 910, in one or more of the various embodiments, if the execution of the file system operation is a dry-run, control may flow to flowchart block 914; otherwise, control may flow to flowchart block 912. In one or more of the various embodiments, access verification may occur during a non-operational (e.g., dry-run) execution of the file system operation.

At flowchart block 912, in one or more of the various embodiments, the file system engine may be arranged to execute the action. Next, control may flow to flowchart block 916. In one or more of the various embodiments, if access verification occurring concurrent with a live execution of the file system operation, the file system engine may execute the action normally.

At flowchart block 914, in one or more of the various embodiments, the verification engine may be arranged to simulate the action. In some embodiments, some actions may produce persistent side-effects or changes to one or more file system objects or the file system while other actions may not produce persistent side-effects or changes. Accordingly, in some embodiments, if the action updates the persistent state or data of a file system object, its execution may be simulated. And, in some embodiments, if the action does not produce persistent side-effects or changes to the file system, it may be executed normally rather than simulated.

At flowchart block 916, in one or more of the various embodiments, the verification engine may be arranged to capture information associated with the execution of the action. This information may include result codes, error codes, return values, or the like. In some embodiments, actions may include querying databases or other services. Accordingly, in some embodiments, the information may include lists, result sets, or the like.

In one or more of the various embodiments, the captured action result information may be collected with or distributed similarly as the pre-action information. Accordingly, the action result information may be included in an access verification report, printed to a console screen, stored in a log file, or the like, or combination thereof.

At decision block 918, in one or more of the various embodiments, if there are more actions to perform, control may loop back to flowchart block 904; otherwise, control may be returned to a calling process.

It will be understood that each flowchart block of the flowchart illustrations, and combinations of flowchart blocks in the flowchart illustrations, can be implemented by computer program instructions. These program instructions may be provided to a processor to produce a machine, such that the instructions, which execute on the processor, create means for implementing the actions specified in the flowchart block or flowchart blocks. The computer program instructions may be executed by a processor to cause a series of operational steps to be performed by the processor to produce a computer-implemented process such that the instructions, which execute on the processor to provide steps for implementing the actions specified in the flowchart block or flowchart blocks. The computer program instructions may also cause at least some of the operational steps shown in the blocks of the flowchart to be performed in parallel. Moreover, some of the steps may also be performed across more than one processor, such as might arise in a multiprocessor computer system. In addition, one or more flowchart blocks or combinations of flowchart blocks in the flowchart illustration may also be performed concurrently with other flowchart blocks or combinations of flowchart blocks, or even in a different sequence than illustrated without departing from the scope or spirit of the invention.

Accordingly, flowchart blocks of the flowchart illustration support combinations of means for performing the specified actions, combinations of steps for performing the specified actions and program instruction means for performing the specified actions. It will also be understood that each flowchart block of the flowchart illustration, and combinations of flowchart blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
    instantiating a verification engine to perform actions including:
        obtaining a user identifier and an object identifier, wherein the user identifier is associated with one or more users and the object identifier is associated with one or more target objects;
        determining one or more target identities based on the user identifier, wherein the one or more target identities are associated with two or more file system protocols, and wherein one of the two or more file system protocols is native to the file system for utilizing a distributed underlying file distribution system for storing the one or more target objects;
        determining one or more permission entries associated with the one or more target objects, wherein the one or more permission entries are associated with the two or more file system protocols;
        when subsequent execution of one or more operations on the one or more target objects are identified to cause one or more of persistent side effects or changes to the file system, employing a file system engine to simulate the execution of the one or more identified operations, wherein non-identified operations are executed instead of simulated;
        employing the one or more target identities and the one or more permission entries to directly verify one or more access rights to the one or more target objects for the one or more users, wherein the access rights are based on the one or more target identities and the one or more permission entries, and wherein the direct verification reduces latency and improves accuracy in providing access rights to the one or more users for the one or more target objects; and
        providing a report that includes the one or more target identities, the one or more permission entries, captured information during simulation of the one or more identified operations, or the one or more access rights.

2. The method of claim 1, wherein verifying the one or more access rights further comprises:
    determining a path in the file system to the one or more target objects;
    traversing the path in the file system, wherein the one or more permission entries of each file system object disposed between a root of the file system and the one or more target objects are evaluated; and determining the one or more access rights of each intervening file system object for the one or more users based on the one or more target identities and the one or more permission entries.

3. The method of claim 1, wherein verifying the one or more access rights further comprises:

providing a target network address that is associated with the one or more users; and modifying the one or more access rights based on the target network address.

4. The method of claim 1, wherein determining the one or more target identities, further comprises:

determining one or more target groups that include the one or more users as members; and providing one or more additional access rights based on the one or more determined target groups.

5. The method of claim 1, wherein the verification engine performs further actions, including:

determining pre-action access information that is associated with one or more access actions, wherein the pre-action access information includes context data or metadata that is associated with the one or more access actions; and further determining the one or more access rights for the one or more users based on one or more portions of the pre-action access information.

6. The method of claim 1, further comprising, instantiating the file system engine to perform actions, including:

comparing the one or more access rights with one or more access requests that are associated with the user identifier and the object identifier; and executing the one or more access requests based on an affirmative result of the comparison, wherein the one or more access requests are denied based on negative result of the comparison.

7. The method of claim 1, wherein the verification engine performs further actions, including:

determining one or more access actions that are associated with the user identifier and the object identifier, wherein an execution of the one or more access action produces one or more persistent side-effects to the file system; and simulating the execution of the one or more access actions.

8. A processor readable non-transitory storage media that includes instructions for managing data in a file system over a network, wherein execution of the instructions by one or more processors on one or more network computers performs actions, comprising:

instantiating a verification engine to perform actions including:

obtaining a user identifier and an object identifier, wherein the user identifier is associated with one or more users and the object identifier is associated with one or more target objects;

determining one or more target identities based on the user identifier, wherein the one or more target identities are associated with two or more file system protocols, and wherein one of the two or more file system protocols is native to the file system for utilizing a distributed underlying file distribution system for storing the one or more target objects;

determining one or more permission entries associated with the one or more target objects, wherein the one or more permission entries are associated with the two or more file system protocols;

when subsequent execution of one or more operations on the one or more target objects are identified to cause one or more of persistent side effects or changes to the file system, employing a file system engine to simulate the execution of the one or more identified operations, wherein non-identified operations are executed instead of simulated;

employing the one or more target identities and the one or more permission entries to directly verify one or more access rights to the one or more target objects for the one or more users, wherein the access rights are based on the one or more target identities and the one or more permission entries, and wherein the direct verification reduces latency and improves accuracy in providing access rights to the one or more users for the one or more target objects; and providing a report that includes the one or more target identities, the one or more permission entries, captured information during simulation of the one or more identified operations, or the one or more access rights.

9. The media of claim 8, wherein verifying the one or more access rights further comprises:

determining a path in the file system to the one or more target objects;

traversing the path in the file system, wherein the one or more permission entries of each file system object disposed between a root of the file system and the one or more target objects are evaluated; and determining the one or more access rights of each intervening file system object for the one or more users based on the one or more target identities and the one or more permission entries.

10. The media of claim 8, wherein verifying the one or more access rights further comprises:

providing a target network address that is associated with the one or more users; and modifying the one or more access rights based on the target network address.

11. The media of claim 8, wherein determining the one or more target identities, further comprises:

determining one or more target groups that include the one or more users as members; and providing one or more additional access rights based on the one or more determined target groups.

12. The media of claim 8, wherein the verification engine performs further actions, including:

determining pre-action access information that is associated with one or more access actions, wherein the pre-action access information includes context data or metadata that is associated with the one or more access actions; and further determining the one or more access rights for the one or more users based on one or more portions of the pre-action access information.

13. The media of claim 8, further comprising, instantiating the file system engine to perform actions, including:

comparing the one or more access rights with one or more access requests that are associated with the user identifier and the object identifier; and executing the one or more access requests based on an affirmative result of the comparison, wherein the one or more access requests are denied based on negative result of the comparison.

14. The media of claim 8, wherein the verification engine performs further actions, including:
- determining one or more access actions that are associated with the user identifier and the object identifier, wherein an execution of the one or more access action produces one or more persistent side-effects to the file system; and
- simulating the execution of the one or more access actions.

15. A system for managing data in a file system comprising:
- a network computer, comprising:
  - a transceiver that communicates over the network;
  - a memory that stores at least instructions; and
  - one or more processors that execute instructions that perform actions, including:
  - instantiating a verification engine to perform actions including:
    - obtaining a user identifier and an object identifier, wherein the user identifier is associated with one or more users and the object identifier is associated with one or more target objects;
    - determining one or more target identities based on the user identifier, wherein the one or more target identities are associated with two or more file system protocols;
    - determining one or more permission entries associated with the one or more target objects, wherein the one or more permission entries are associated with the two or more file system protocols, and wherein one of the two or more file system protocols is native to the file system for utilizing a distributed underlying file distribution system for storing the one or more target objects;
    - when subsequent execution of one or more operations on the one or more target objects are identified to cause one or more of persistent side effects or changes to the file system, employing a file system engine to simulate the execution of the one or more identified operations, wherein non-identified operations are executed instead of simulated;
    - employing the one or more target identities and the one or more permission entries to directly verify one or more access rights to the one or more target objects for the one or more users, wherein the access rights are based on the one or more target identities and the one or more permission entries, and wherein the direct verification reduces latency and improves accuracy in providing access rights to the one or more users for the one or more target objects; and
    - providing a report that includes the one or more target identities, the one or more permission entries, captured information during simulation of the one or more identified operations, or the one or more access rights; and
- a client computer, comprising:
  - a transceiver that communicates over the network;
  - a memory that stores at least instructions; and
  - one or more processors that execute instructions that perform actions, including:
    - providing one or more of the user identifier or the object identifier.

16. The system of claim 15, wherein verifying the one or more access rights further comprises:
- determining a path in the file system to the one or more target objects;
- traversing the path in the file system, wherein the one or more permission entries of each file system object disposed between a root of the file system and the one or more target objects are evaluated; and
- determining the one or more access rights of each intervening file system object for the one or more users based on the one or more target identities and the one or more permission entries.

17. The system of claim 15, wherein verifying the one or more access rights further comprises:
- providing a target network address that is associated with the one or more users; and
- modifying the one or more access rights based on the target network address.

18. The system of claim 15, wherein determining the one or more target identities, further comprises:
- determining one or more target groups that include the one or more users as members; and
- providing one or more additional access rights based on the one or more determined target groups.

19. The system of claim 15, wherein the verification engine performs further actions, including:
- determining pre-action access information that is associated with one or more access actions, wherein the pre-action access information includes context data or metadata that is associated with the one or more access actions; and
- further determining the one or more access rights for the one or more users based on one or more portions of the pre-action access information.

20. The system of claim 15, further comprising, instantiating the file system engine to perform actions, including:
- comparing the one or more access rights with one or more access requests that are associated with the user identifier and the object identifier; and
- executing the one or more access request based on an affirmative result of the comparison, wherein the one or more access requests are denied based on negative result of the comparison.

21. The system of claim 15, wherein the verification engine performs further actions, including:
- determining one or more access actions that are associated with the user identifier and the object identifier, wherein an execution of the one or more access action produces one or more persistent side-effects to the file system; and
- simulating the execution of the one or more access actions.

22. A network computer for managing data in a file system, comprising:
- a transceiver that communicates over the network;
- a memory that stores at least instructions; and
- one or more processors that execute instructions that perform actions, including:
  - instantiating a verification engine to perform actions including:
    - obtaining a user identifier and an object identifier, wherein the user identifier is associated with one or more users and the object identifier is associated with one or more target objects;
    - determining one or more target identities based on the user identifier, wherein the one or more target identities are associated with two or more file system protocols;
    - determining one or more permission entries associated with the one or more target objects, wherein the one or more permission entries are associated with the two or more file system protocols, and wherein one of the two or more file system protocols is native to the file system for utilizing a distributed underlying file distribution system for storing the one or more target objects;

when subsequent execution of one or more operations on the one or more target objects are identified to cause one or more of persistent side effects or changes to the file system, employing a file system engine to simulate the execution of the one or more identified operations, wherein non-identified operations are executed instead of simulated;

employing the one or more target identities and the one or more permission entries to directly verify one or more access rights to the one or more target objects for the one or more users, wherein the access rights are based on the one or more target identities and the one or more permission entries, and wherein the direct verification reduces latency and improves accuracy in providing access rights to the one or more users for the one or more target objects; and providing a report that includes the one or more target identities, the one or more permission entries, captured information during simulation of the one or more identified operations, or the one or more access rights.

23. The network computer of claim 22, wherein verifying the one or more access rights further comprises:

determining a path in the file system to the one or more target objects;

traversing the path in the file system, wherein the one or more permission entries of each file system object disposed between a root of the file system and the one or more target objects are evaluated; and determining the one or more access rights of each intervening file system object for the one or more users based on the one or more target identities and the one or more permission entries.

24. The network computer of claim 22, wherein verifying the one or more access rights further comprises:

providing a target network address that is associated with the one or more users; and modifying the one or more access rights based on the target network address.

25. The network computer of claim 22, wherein determining the one or more target identities, further comprises:

determining one or more target groups that include the one or more users as members; and providing one or more additional access rights based on the one or more determined target groups.

26. The network computer of claim 22, wherein the verification engine performs further actions, including:

determining pre-action access information that is associated with one or more access actions, wherein the pre-action access information includes context data or metadata that is associated with the one or more access actions; and further determining the one or more access rights for the one or more users based on one or more portions of the pre-action access information.

27. The network computer of claim 22, further comprising, instantiating the file system engine to perform actions, including:

comparing the one or more access rights with one or more access requests that are associated with the user identifier and the object identifier; and executing the one or more access requests based on an affirmative result of the comparison, wherein the one or more access requests are denied based on negative result of the comparison.

28. The network computer of claim 22, wherein the verification engine performs further actions, including:

determining one or more access actions that are associated with the user identifier and the object identifier, wherein an execution of the one or more access action produces one or more persistent side-effects to the file system; and simulating the execution of the one or more access actions.

* * * * *